United States Patent
Lin et al.

(10) Patent No.: US 7,655,200 B2
(45) Date of Patent: Feb. 2, 2010

(54) METHOD FOR PURIFYING EXHAUST OF WASTE GAS USING ATOMIZED FLUID DROPLETS COMBINED WITH TURBULENT FLOW

(76) Inventors: Wen-Hao Lin, P.O. Box No. 6-57, Junghe, Taipei 235 (TW); Pi-Chung Hsiao, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/353,114

(22) Filed: Feb. 14, 2006

(65) Prior Publication Data
US 2007/0189947 A1 Aug. 16, 2007

(51) Int. Cl.
*B01D 53/34* (2006.01)
*B01D 53/78* (2006.01)

(52) U.S. Cl. .................. 423/210; 423/237; 423/238; 423/240 R

(58) Field of Classification Search ............... 423/210, 423/237, 238, 240 R
See application file for complete search history.

(56) References Cited

U.S. PATENT DOCUMENTS

| | | | | |
|---|---|---|---|---|
| 2,935,375 A | * | 5/1960 | Boucher | 423/210 |
| 3,919,389 A | * | 11/1975 | Jonescu | 423/210 |
| 4,024,208 A | * | 5/1977 | Wetteborn | 261/112.1 |
| 4,138,231 A | * | 2/1979 | Hedenas et al. | 95/196 |
| 4,208,381 A | * | 6/1980 | Isahaya et al. | 423/210 |
| 4,213,945 A | * | 7/1980 | Haese et al. | 423/240 R |
| 4,238,461 A | * | 12/1980 | Devries | 423/210 |
| 4,844,874 A | * | 7/1989 | deVries | 423/210 |

\* cited by examiner

*Primary Examiner*—Timothy C Vanoy
(74) *Attorney, Agent, or Firm*—Muncy, Geissler, Olds & Lowe, PLLC

(57) ABSTRACT

A method for purifying exhaust of waste gas using atomized fluid droplets combined with turbulent flow, including the following steps: a). atomizing the absorption or reacting fluids to microsized droplets; b). enabling waste gas to pass through the aforementioned absorption or reacting fluids and creating a turbulent flow to thoroughly react the waste gas with the droplets; c). reacting of harmful substances in the waste gas with droplets of the absorption or reacting fluids; d). implementing demisting treatment of the waste gas flow; e). discharging the treated waste gas. The aforementioned steps of the present invention enable the purification of waste gas without the need for packing, and achieve high removal efficiency and low energy consumption.

4 Claims, 7 Drawing Sheets

METHOD FOR PURIFYING EXHAUST OF WASTE GAS USING ATOMIZED FLUID DROPLETS COMBINED WITH TURBULENT FLOW

BACKGROUND OF THE INVENTION (a) Field of the Invention

The present invention relates to a method for purifying exhaust of waste gas using atomized fluid droplets combined with turbulent flow, which atomizes droplets of absorption or reacting fluids to microsized scale and creates a turbulent flow that increases probability of contact between waste gas and the absorption or reacting fluids. Moreover, the present invention eliminates the need for packing and has low energy consumption when in operation.

(b) Description of the Prior Art

Industrial waste gas contains harmful suspended particles, and in order to reduce the discharge of harmful substances, purifying equipment is placed in the flow path of the waste gas discharge to reduce or filter out the harmful substances therein. A scrubber (or tower scrubber) is one such purifying equipment.

Referring to FIG. 7, which shows a traditional scrubber (9), primarily embodying a sprinkler (91), packing (92) and a mist-elimilator (93). When in operation, waste gas enters an inlet (94) of the scrubber (9), whereupon the sprinkler (91) trickles absorption or reacting fluids (95) onto the packing (92). A fan (96) is installed in an outlet (95) of the scrubber (9), and a negative pressure that the fan (96) produces is used to assist the flow of the interior waste gas in the scrubber (9) and discharge therefrom after purification. A pump (97) functions to enable the absorption or reacting fluids (95) that have fell to flow back to the sprinkler (91) through a pipeline (98). The aforementioned scrubber (packed tower) (9) achieves more than 95% efficiency in removing harmful substances from the waste gas. However, the scrubber (9) still has the following shortcomings:

1. Use of the packing (92) causes greater pressure drop, horsepower of the fan (96) increases substantially with increasing quantities of waste gas to be treated and raising of treatment efficiency, as well as resulting in a corresponding increase in power consumption of the fan.

2. Crystal reactants of the absorption or reacting fluids and the waste gas easily deposit on the packing, thereby increasing pressure drop and reducing efficiency in removing the waste gas.

3. The packing is an expendable material that needs replacing regularly, which correspondingly raises processing cost of the waste gas.

4. The scrubber needs to be regularly shut down and cleaned or the packing disposed in the scrubber needs to be replaced, thereby entailing a relatively long period of shut down.

SUMMARY OF THE INVENTION

The present invention resolves the aforementioned shortcomings of a conventional scrubber (packed tower).

An embodiment of the present invention provides a method for purifying exhaust of waste gas using atomized fluid droplets combined with turbulent flow that includes the following steps:

a). Atomizing the absorption or reacting fluids to microsized droplets;

b). Enabling waste gas to pass through the aforementioned absorption or reacting fluids and creating a turbulent flow to thoroughly make the waste gas come in contact with the droplets of absorption or reacting fluids;

c). Reacting of harmful substances in the waste gas with droplets of the absorption or reacting fluids;

d). Implementing demisting treatment of the waste gas flow;

e). Discharging the treated waste gas.

Size of the droplets of the aforementioned absorption or reacting fluids is between 10 μm and 1000 μm.

Creating a turbulent flow indicated in the aforementioned step b involves spraying the absorption or reacting fluids towards the waste gas at a specific included angle to a travel direction of the waste gas after atomizing the absorption or reacting fluids. The specific included angle is from 30 degrees to 180 degrees and from −30 degrees to −180 degrees. Moreover, the turbulent flow is achieved by installing turbulent plates in the flow path of the waste gas.

Reacting of harmful substances in the waste gas with the droplets of the absorption or reacting fluids indicated in the aforementioned step c involves the harmful substances adhering to the droplets of the absorption or reacting fluids, acid-base neutralization of the harmful substances and the droplets of the absorption or reacting fluids or oxidation-reduction of the harmful substances and the droplets of the absorption or reacting fluids.

The present invention has the following advantages:

1. Eliminates the need for packing, substantially reduces use of expendable material, and saves on operating and maintenance costs.

2. Liquid droplets of the absorption or reacting fluids are controlled to be a specific size, which not only increases contact area between the waste gas and the absorption or reacting fluids and reaction efficiency, but also saves on amount of the absorption or reacting fluids used.

3. Facilitating the turbulent flow phenomenon in the waste gas increases collision probability and reaction efficiency between the absorption or reacting fluids and the waste gas, thereby increasing retention period of the reactant gas in the absorption or reacting fluids and improving removal efficiency.

4. Turbulent plates disposed in the flow path of the waste gas assist rapid and uniform dispersal of the waste gas, thereby enabling large quantities of the waste gas to rapidly react with the absorption or reacting fluids.

5. Horsepower of the fan is reduced, thereby achieving savings of 10-25% in electric energy, and the greater the quantity of waste gas treated and the higher the removal efficiency demand, the greater the savings in electric energy.

6. Hardware maintenance is simple and convenient, and because the present invention does not use packing, thus, shut down and maintenance time can be substantially shortened from the 10-25 man-days required for a traditional scrubber (packed tower) to 0.5 man-days.

7. Efficiency of removing harmful substances from the waste gas is greater than 95%, and bears comparison with the traditional scrubber.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
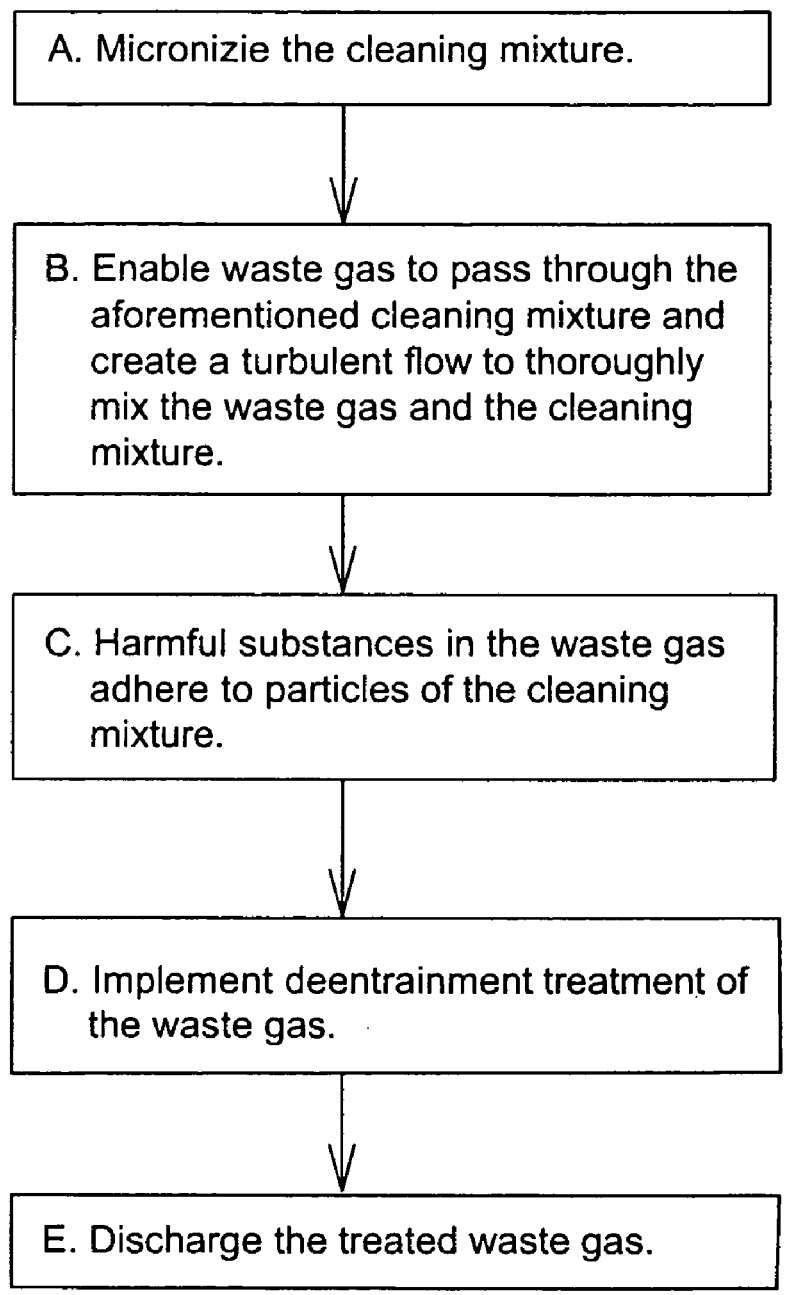
FIG. 1 shows a flow chart according to the present invention.

Referring to FIG. 1, which indicate the processing steps of the present invention as follows:

1. Atomizing the absorption or reacting fluids to micro-sized droplets;
2. Passing waste gas through the aforementioned absorption or reacting fluids, and creating a turbulent flow to effect thorough mixing thereof;
3. Reacting of harmful substances in the waste gas with droplets of the absorption or reacting fluids;
4. Implementing demisting treatment of the waste gas flow;
5. Discharging the treated waste gas.

Figure 2:
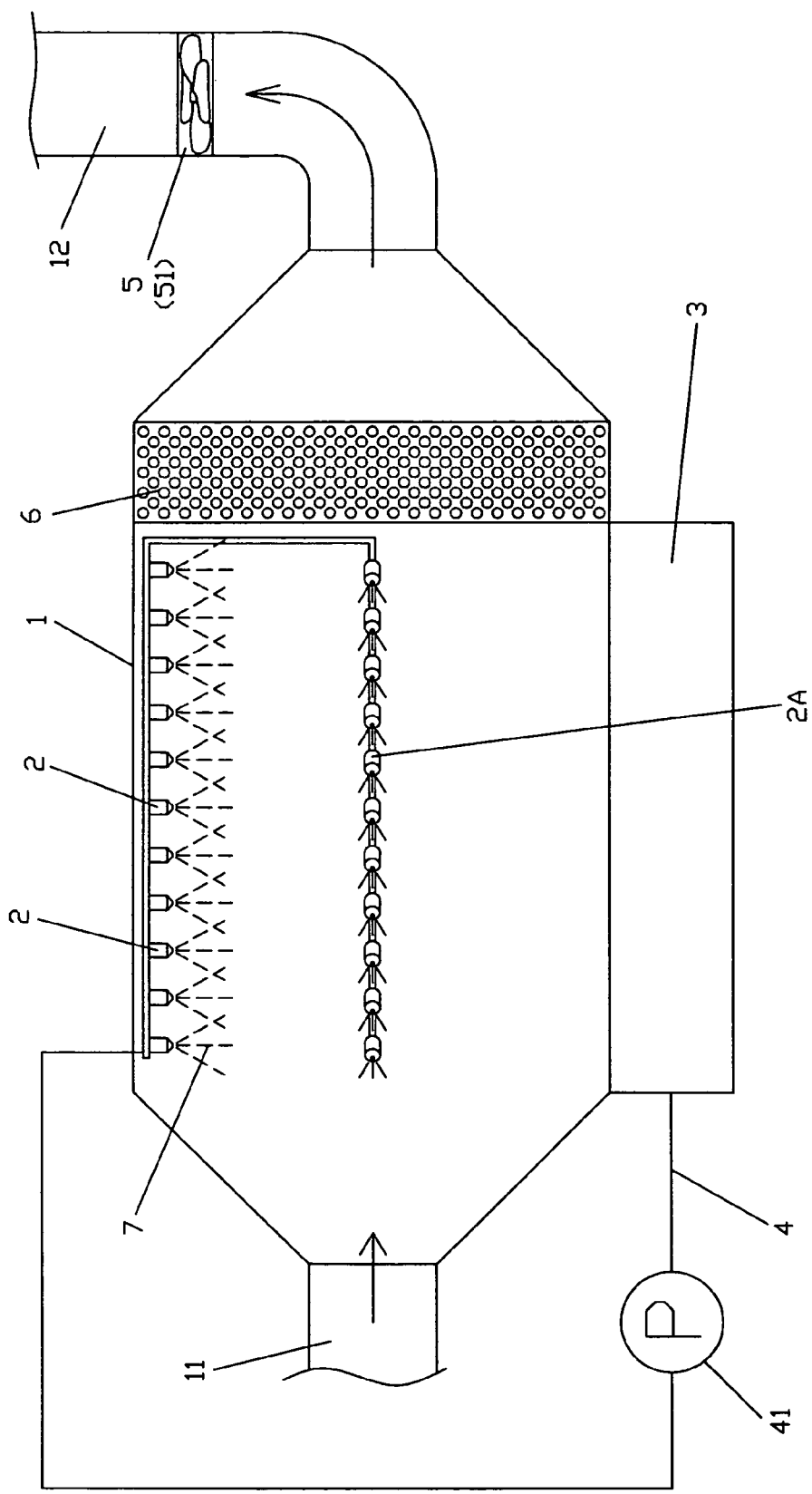
FIG. 2 shows a schematic view of a scrubber according to the present invention (depicting a front view of the path of waste gas).

Referring to FIG. 2, a scrubber (1) of an embodiment of the present invention comprising atomizers (2) (2A), a holding tank (3), a back flow pipeline (4), a negative pressure generator unit (5) and a mist-eliminator (6). When operating the scrubber (1), waste gas enters an inlet (11) of the scrubber (1), and the atomizers (2) (2A) atomize the absorption or reacting fluids (7) to form droplets having sizes between 10 μm and 1000 μm, whereafter the atomized absorption or reacting fluids (7) is thoroughly mixed with the aforementioned waste gas, thereby causing harmful substances in the waste gas to adhere to the droplets of the absorption or reacting fluids (7) and fall into the holding tank (3). The absorption or reacting fluids (7) in the holding tank (3) is then pumped back into the atomizers (2) (2A) through the back flow pipeline (4) by means of a pump (41). The negative pressure generator unit (5) preinstalled in an outlet (12) of the scrubber (1) produces a negative pressure. The preinstalled negative pressure generator unit (5) of the present invention is a fan (51), and the negative pressure that it produces enables the treated waste gas to pass through the mist-elimiator (6), which filters out liquid substances from the waste gas, and finally causes the treated waste gas to flow out the outlet (12).

Figure 3:
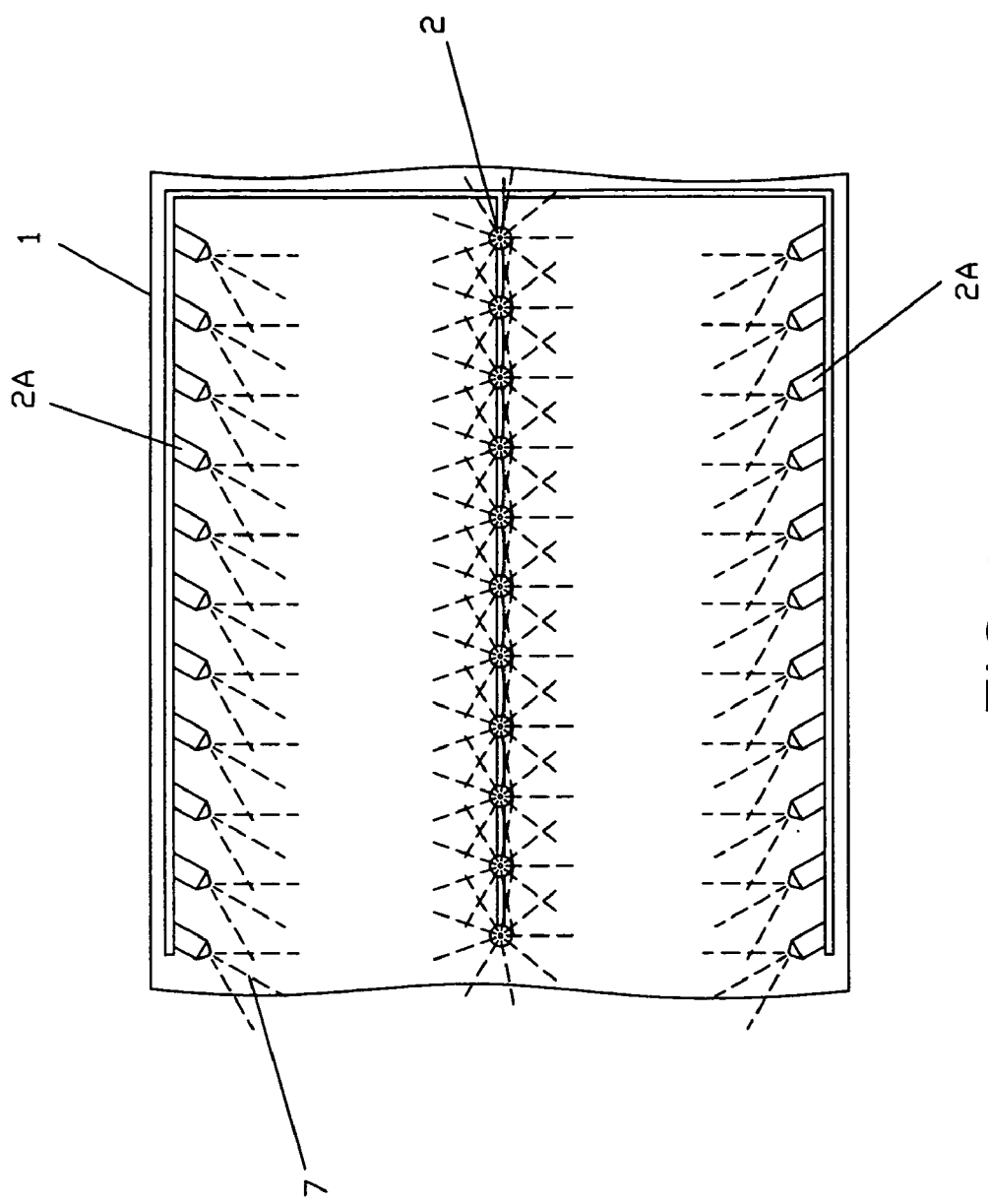
FIG. 3 shows a schematic view depicting disposition of atomizers within the scrubber according to the present invention (depicting a top view of the path of waste gas).

Referring to FIG. 2 in conjunction with FIG. 3, the aforementioned atomizers (2) (2A) are installed with the principle that droplets of the absorption or reacting fluids can be sprayed towards and treat waste gas in space, and produce a turbulent flow. The atomizers (2) (2A) of the present invention are installed in rows, wherein the atomizers (2) are installed above the flow path of the waste gas, and the other two sets of atomizers (2A) are installed on left and right sides of the flow path of the waste gas (if required, a plurality of sets of the atomizers (2A) can be installed on left and right sides of the flow path of the waste gas). In order to strengthen the turbulent flow effect and enable the waste gas and the absorption or reacting fluids (7) to be even more thoroughly mixed, the atomizers (2A) positioned on the left and right side of the flow path of the waste gas are reverse obliquely disposed at a specific spray angle, thereby enabling the reverse sprayed atomized absorption or reacting fluids (7) to produce a turbulence effect in the waste gas that increases mixing between the waste gas and the atomized absorption or reacting fluids (7) and improves efficiency of filtering out harmful substances from the waste gas.

Figure 4:
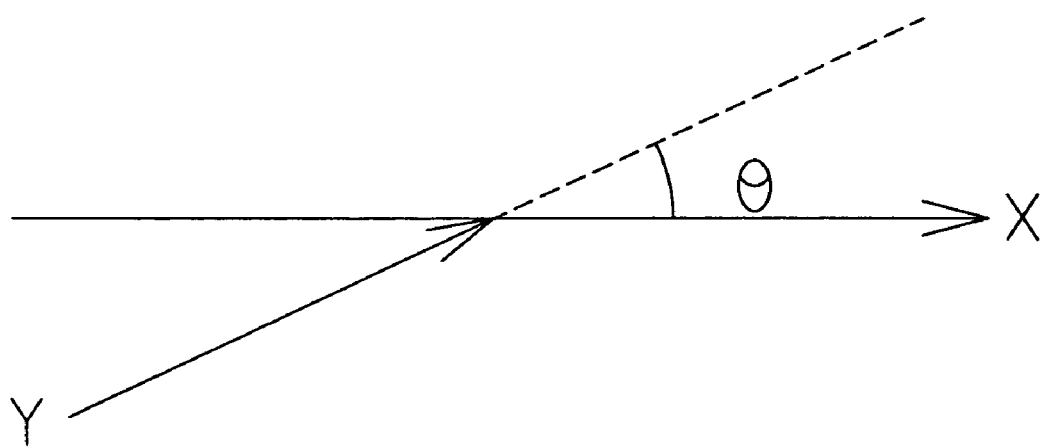
FIG. 4 shows a schematic view depicting an included angle between spray direction of the absorption or reacting fluids and travel direction of the waste gas according to the present invention.

Referring to FIG. 4, which shows a spray direction Y of the aforementioned absorption or reacting fluids (7) that produces an effective turbulent flow when it forms a specific included angle θ with a travel direction X of the waste gas. Preferred angles of the specific included angle θ are from 30 degrees to 180 degrees and from −30 degrees to −180 degrees. When the specific included angle θ is 90 degrees, then the absorption or reacting fluids (7) is sprayed vertically downwards. When the specific included angle θ is −90 degrees, then the absorption or reacting fluids (7) is sprayed vertically upwards. When the specific included angle θ is 180 degrees or −180 degrees, which represent the same horizontal direction, then the absorption or reacting fluids (7) is sprayed in mutually opposite directions along the same travel direction X.

Nozzles of the relevant atomizers (2) (2A) are not necessarily identically reverse oblique disposed along the same row, but depends on disposition needs of the turbulent flow area, the appropriately positioned atomizers (2) (2A) being reverse obliquely disposed to accord therewith.

Figure 5:
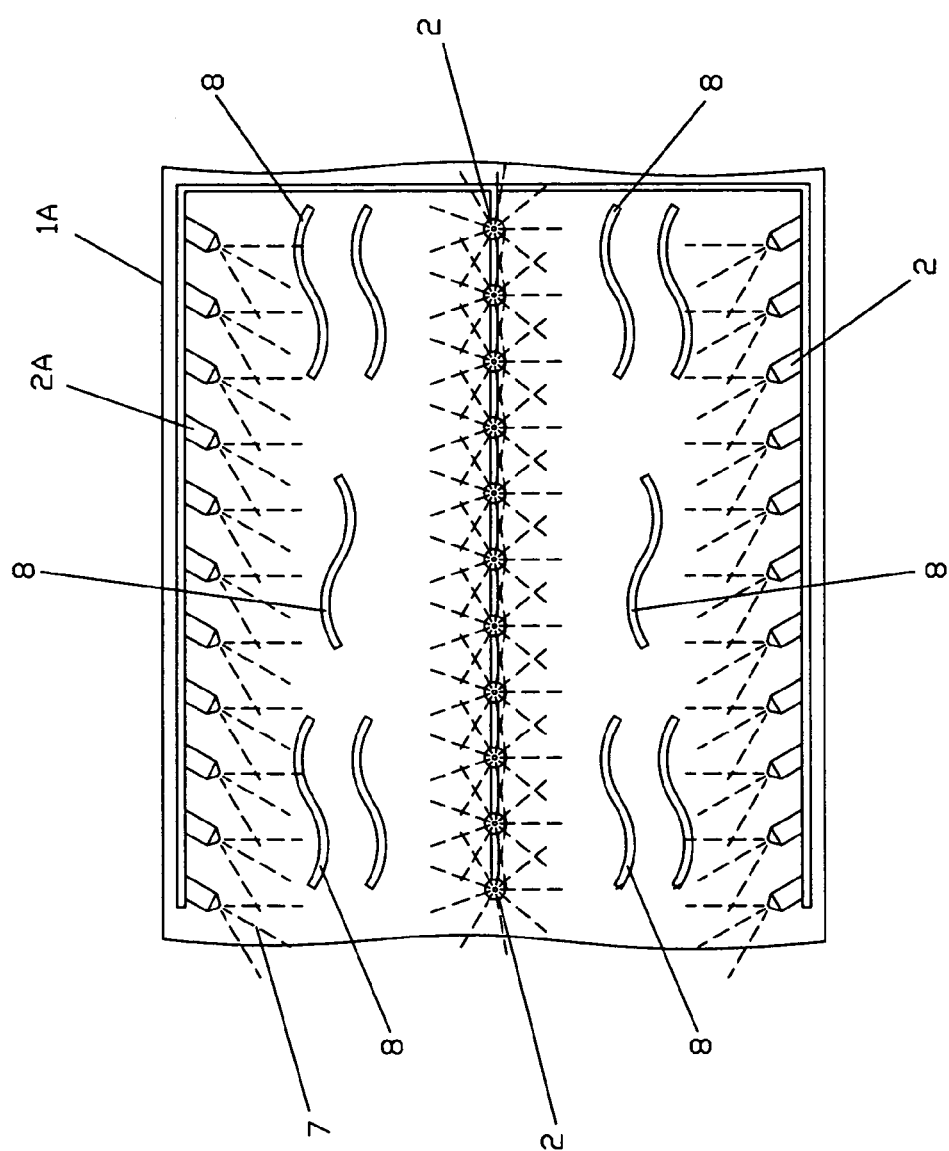
FIG. 5 shows a schematic view of the scrubber including turbulent plates according to the present invention.

Referring to FIG. 5, in order to achieve a better turbulent effect, turbulent plates (8) can be further disposed in the flow path of the waste gas of a scrubber (1A) to ensure that a turbulent flow is produced when the waste gas is flowing.

Figure 6:
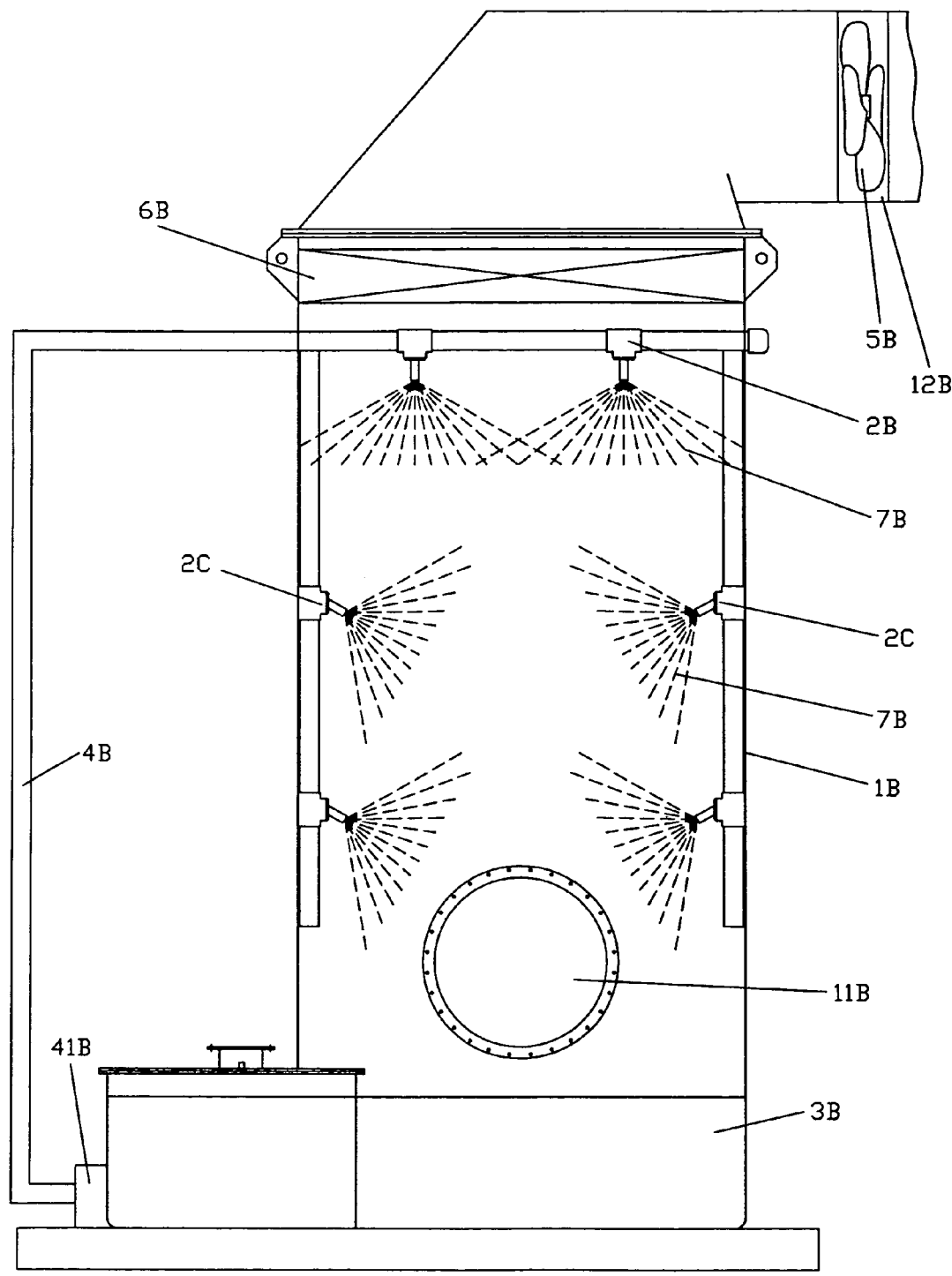
FIG. 6 shows a schematic view of another embodiment the scrubber according to the present invention.
Figure 7:
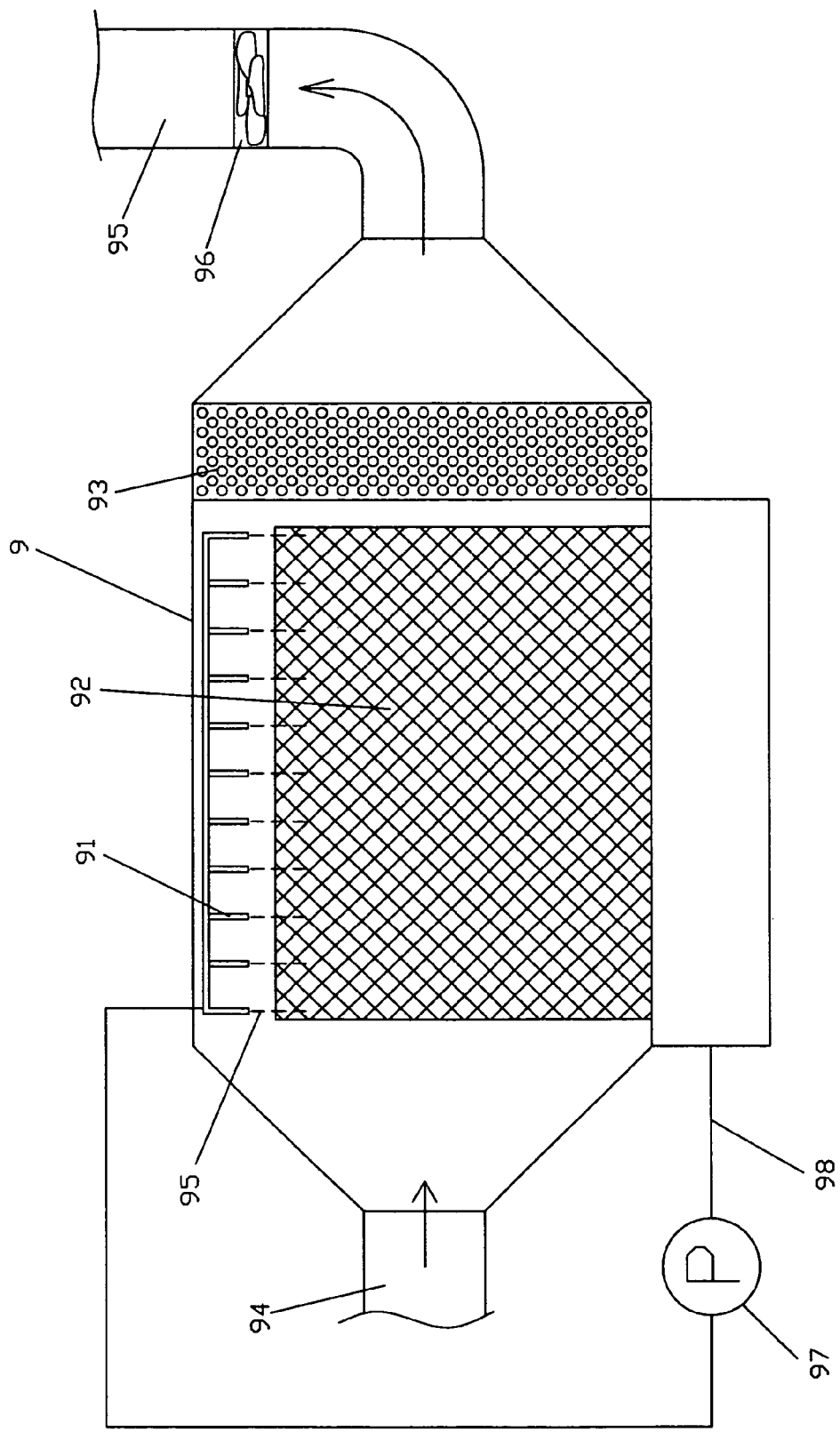
FIG. 7 shows a schematic view of a conventional scrubber.

Referring to FIG. 6, which shows an embodiment of the present invention adopting a vertical type tower scrubber, wherein a tower scrubber (1B) comprises atomizers (2B) (2C), a holding tank (3B), a back flow pipeline (4B), a negative pressure generator unit (5B) and a mist-elimiator (6B). When operating, the waste gas enters an inlet (11B) the tower scrubber (1B). When operating the scrubber (1B), waste gas enters an inlet (11B) of the scrubber (1B), and the atomizers (2B) (2C) atomize the absorption or reacting fluids (7B) to form droplets having sizes between 10 μm and 1000 μm, whereafter the atomized absorption or reacting fluids (7B) is thoroughly mixed with the aforementioned waste gas, thereby causing harmful substances in the waste gas to adhere to the droplets of the absorption or reacting fluids (7B) and fall into the holding tank (3B). The absorption or reacting fluids (7B) in the holding tank (3B) is then pumped back into the atomizers (2B) (2C) through the back flow pipeline (4B) by means of a pump (41B). The negative pressure generator unit (5B) preinstalled in an outlet (12B) of the scrubber (1B) produces a negative pressure that enables the treated waste gas to pass through the mist-elimiator (6B), which filters out liquid substances from the waste gas, and finally causes the treated waste gas to flow out the outlet (12B). The aforementioned atomizers (2B) are horizontally installed in the scrubber (1B) above the flow path of the waste gas to enable downward spraying of the absorption or reacting fluids (7B), and the other atomizers (2C) are installed on left and right sides of the flow path of the waste gas to enable oblique spraying of the absorption or reacting fluids (7B). Hence, the reverse sprayed atomized absorption or reacting fluids (7B) is able to produce a turbulence effect in the waste gas, thereby increasing mixing between the waste gas and the atomized absorption or reacting fluids (7B), and improving efficiency of filtering out harmful substances from the waste gas.

Because the atomizers (2), (2A), (2B), (2C) of the present invention thoroughly atomize the absorption or reacting fluids (7), (7B) to form droplets between 10 μm and 1000 μm, thus, the droplets of the absorption or reacting fluids (7), (7B) are uniformly distributed in the flow path of the waste gas, and function in coordination with the turbulent flow effect to achieve thorough mixing between the waste gas and the droplets of the absorption or reacting fluids (7), (7B), thereby effectively raising efficiency of filtering out harmful substances from the waste gas. Furthermore, the method of atomizing the absorption or reacting fluids (7), (7B) replaces the traditional packing, thereby eliminating the need to regularly replace the packing, and, thus, effectively saving equipment expenses, and reducing time period and frequency of shutting down the scrubber.

Table 1 shows test results of ammonia purification efficiency of a working model of the present invention, from which it can be known that prior to atomizing absorption or reacting fluids the concentration of ammonia at a tail end of the flow path of the waste gas is 18.00 ppm. After atomizing the absorption or reacting fluids, the ammonia concentration at the tail end of the flow path of the waste gas has been substantially reduced to 3.5 ppm. If a turbulent flow effect is introduced, the ammonia concentration at the tail end of the flow path of the waste gas has been reduced even more substantially to between 1.82 ppm and 0.2 ppm. These test results clearly show that the present invention is able to unequivocally demonstrate purification of waste gas.

TABLE 1

| Experiment No. | Gas flow rate (m³/min) | Absorption or reacting fluids atomized | Turbulent flow used | Tail end NH₃ concentration (ppm) | Acid added | Gas purification efficiency (%) |
|---|---|---|---|---|---|---|
| 1 | 108 | No  | No  | 18.00 | No  | 0 |
| 2 | 108 | Yes | No  | 3.50  | Yes | 80.6 |
| 3 | 108 | Yes | Yes | 0.20  | Yes | 98.9 |
| 4 | 117 | Yes | Yes | 0.55  | Yes | 96.9 |
| 5 | 125 | Yes | Yes | 1.82  | Yes | 89.9 |

Table 2 shows test results of hydrochloric acid gas purification efficiency of a working model of the present invention, from which it can be known that prior to atomizing the absorption or reacting fluids the concentration of hydrochloric acid gas at a tail end of the flow path of the waste gas is 15.00 ppm. After atomizing the absorption or reacting fluids, the hydrochloric acid gas concentration at the tail end of the flow path of the waste gas has been substantially reduced to 2.8 ppm. If a turbulent flow effect is introduced, the hydrochloric acid gas concentration at the tail end of the flow path of the waste gas has been reduced even more substantially to between 0.18 ppm and 1.48 ppm. These test results clearly show that the present invention is able to unequivocally demonstrate purification of waste gas.

TABLE 2

| Experiment No. | Gas flow rate (m³/min) | Absorption or reacting fluids atomized | Turbulent flow used | Tail end HCl concentration (ppm) | Acid added | Gas purification efficiency (%) |
|---|---|---|---|---|---|---|
| 1 | 108 | No  | No  | 15.00 | No  | 0 |
| 2 | 108 | Yes | No  | 2.80  | Yes | 82.3 |
| 3 | 108 | Yes | Yes | 0.18  | Yes | 99.0 |
| 4 | 117 | Yes | Yes | 0.43  | Yes | 97.1 |
| 5 | 125 | Yes | Yes | 1.48  | Yes | 90.1 |

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A method for purifying exhaust of waste gas using atomized fluid droplets combined with turbulent flow, comprising the following steps:

a). atomizing the absorption or reacting fluids to microsized droplets;

b). enabling waste gas to pass through the aforementioned absorption or reacting fluids and creating a turbulent flow to thoroughly mix the waste gas and the absorption or reacting fluids;

c). reacting of harmful substances in the waste gas with droplets of the absorption or reacting fluids;

d). implementing demisting treatment of the waste gas flow;

e). discharging the treated waste gas, wherein size of the droplets of the absorption or reacting fluids is between 10 μm and 1000 μm, wherein creating a turbulent flow involves spraying the absorption or reacting fluids towards the waste gas at a specific included angle to a travel direction of the waste gas after atomizing the absorption or reacting fluids, the included angle is from 30 degrees to 180 degrees and from −30 degrees to −180 degrees.

2. The method for purifying exhaust of waste gas using atomized fluid droplets combined with turbulent flow according to claim 1, wherein reacting of harmful substances in the waste gas with the droplets of the absorption or reacting fluids involves the harmful substances adhering to the droplets of the absorption or reacting fluids.

3. The method for purifying exhaust of waste gas using atomized fluid droplets combined with turbulent flow according to claim 1, wherein reacting of harmful substances in the waste gas with the droplets of the absorption or reacting fluids involves acid-base neutralization of the harmful substances and the droplets of the absorption or reacting fluids.

4. The method for purifying exhaust of waste gas using atomized fluid droplets combined with turbulent flow according to claim 1, wherein reacting of harmful substances in the waste gas with the droplets of the absorption or reacting fluids involves oxidation-reduction of the harmful substances and the droplets of the absorption or reacting fluids.

* * * * *